R. S. MERRILL.
LAMP.

No. 187,766.　　　　　　　　Patented Feb. 27, 1877.

Attest
Ewell A Dick
Jno. L Condron

Inventor:
Rufus S. Merrill by
Pollok & Bailey
his attorneys

UNITED STATES PATENT OFFICE.

RUFUS S. MERRILL, OF BOSTON, MASS., ASSIGNOR OF ONE-HALF HIS RIGHT TO HERMAN G. MOEHRING, OF PHILADELPHIA, PA.

IMPROVEMENT IN LAMPS.

Specification forming part of Letters Patent No. 187,766, dated February 27, 1877; application filed February 7, 1877.

*To all whom it may concern:*

Be it known that I, RUFUS S. MERRILL, of Boston, Massachusetts, have invented certain new and useful Improvements in Lamps, of which the following is a specification:

My invention relates to lamps—particularly glass lamps—in which the bowl or reservoir that contains the oil is removable from a supporting pedestal or holder.

When the reservoir is fitted to its holder, and glass is thus in contact with glass, there is danger of this brittle material chipping or fracturing, when the lamp is carelessly removed from or replaced in the holder, or in case of any jar or sudden movement of the lamp. To obviate this difficulty is the object of my present invention, which consists in providing for the glass reservoir a metallic bearing, interposed between the reservoir and the holder, and serving to prevent direct contact of the glass surfaces. With the metallic bearing I also combine an annular elastic cushion, such as a fine coiled-wire spring, which, by contact with the reservoir, steadies it in place in the holder and prevents it from coming into sudden contact therewith when subjected to lateral play therein.

The nature of my invention and the manner in which the same is or may be carried into effect will be understood by reference to the accompanying drawings, in which—

Figure 1:
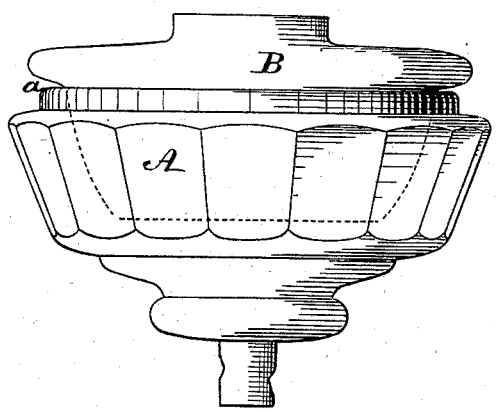
Figure 2:
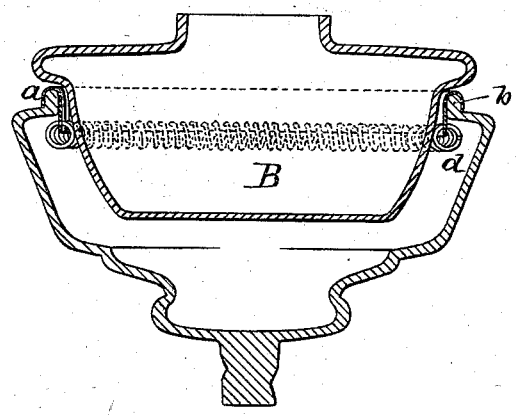
Figure 3:
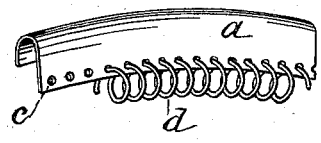

Figure 1 represents a side elevation; Fig. 2, a vertical section of a lamp made in accordance with my said invention; and Fig. 3 shows, in perspective, a detail view of the cushion referred to.

A is the reservoir-holder, made of glass, porcelain, or the like, and forming part of or attached to a pedestal, bracket, or other ordinary or suitable lamp-support. The mouth of the holder is provided with a rim, $a$, made preferably of sheet metal, swaged upon the annular upright flange $b$ that forms the top of the holder. This rim $a$ constitutes the metallic bearing for the oil reservoir or bowl B, which fits in the holder and rests on the metallic rim, as shown.

To provide an elastic or yielding cushion, which will prevent the reservoir from wabbling or moving about in the holder, I make use of spirally-coiled fine wire $d$ located within the holder and secured to the lower edge of the metallic rim $a$. It may be so secured in any suitable manner. I prefer to accomplish the result by passing the wire through a series of holes, $c$, which are formed close together and extend around the entire circumference of the rim. By thus threading the wire through these holes, I form the coil, and at the same time attach it by each fold to the rim.

I would remark, in conclusion, that the metallic bearing and the elastic cushion may be applied either to the reservoir or to the holder. The latter plan is represented in the drawing, and is that which I prefer. Or both reservoir and holder may be sheathed with metal at the points where they would otherwise be in direct contact; also, the cushion or packing may be formed otherwise and of a different material than that which is herein described, although the latter is, on the whole, to be preferred.

What I claim, and desire to secure by Letters Patent, is as follows:

1. The movable oil-reservoir and its holder, formed of glass, porcelain, or other brittle and fragile material, in combination with an interposed metallic bearing, substantially as set forth.

2. The removable oil-reservoir and its holder, formed of glass, porcelain, or other brittle and fragile material, in combination with an interposed metallic bearing and an elastic or yielding cushion or packing, which prevents the wabbling or lateral play of the reservoir in the holder, as set forth.

3. The combination, substantially as set forth, of the reservoir, the holder, its metallic rim, and attached coiled-wire spring.

In testimony that I claim the foregoing as my own I affix my signature in presence of two witnesses.

RUFUS S. MERRILL.

Witnesses:
  A. POLLOK,
  EWELL A. DICK.